March 2, 1937.  M. V. ROSS  2,072,511
PIANO TEACHING APPARATUS
Filed March 30, 1936  2 Sheets-Sheet 1
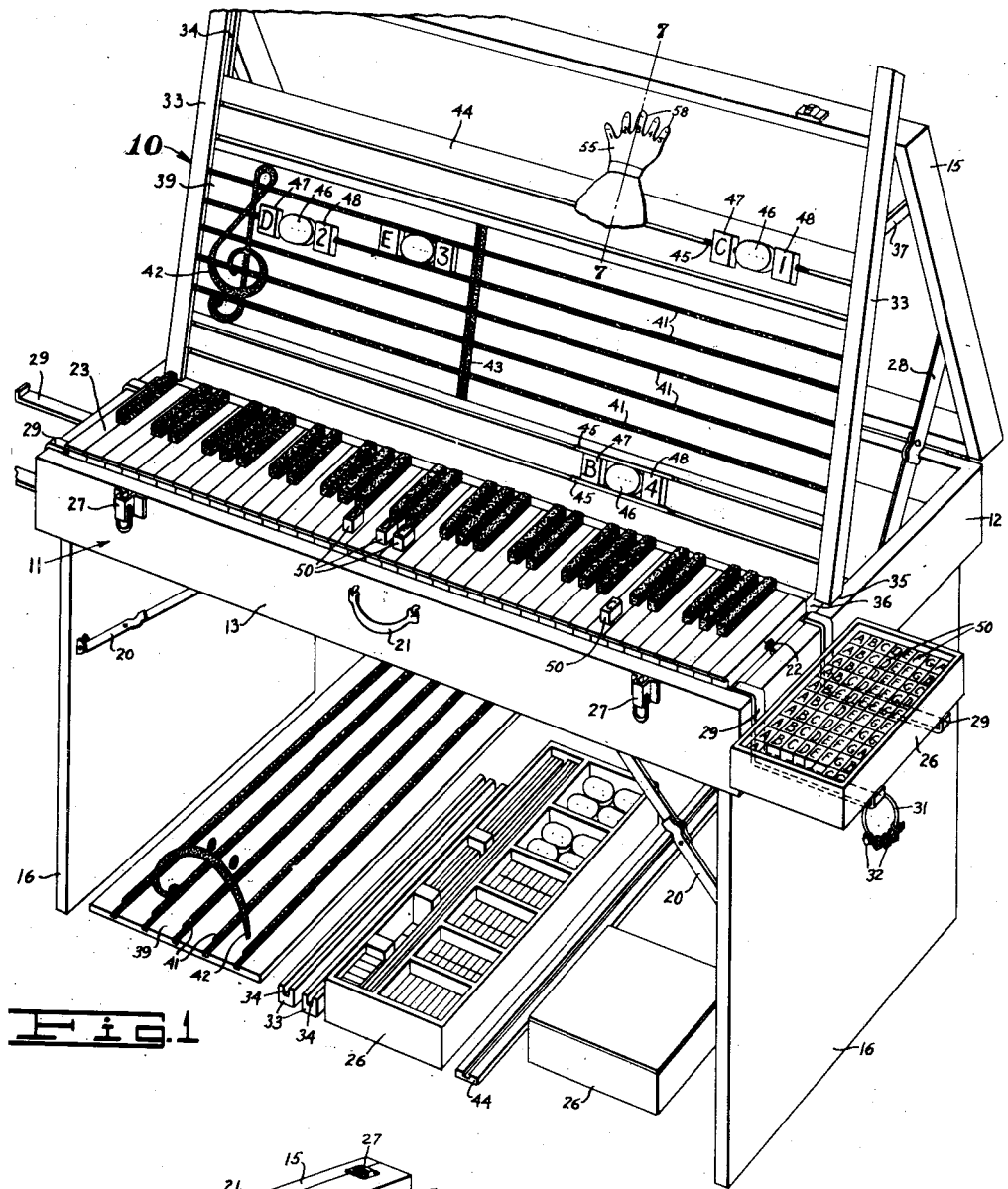
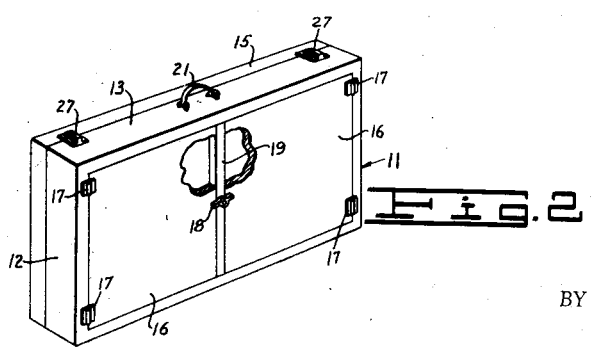
INVENTOR.
Marjorie Vincent Ross.
BY
ATTORNEY.

March 2, 1937.  M. V. ROSS  2,072,511
PIANO TEACHING APPARATUS
Filed March 30, 1936    2 Sheets-Sheet 2
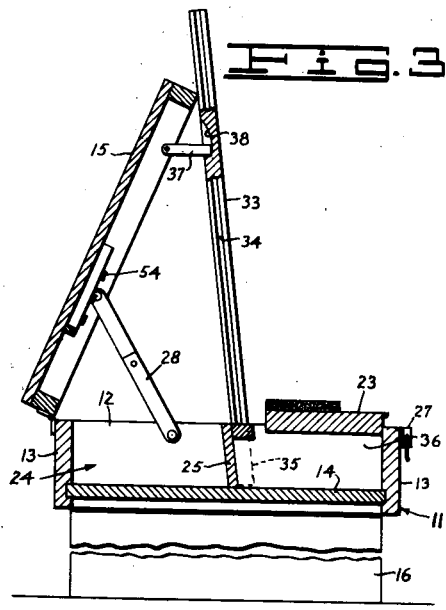
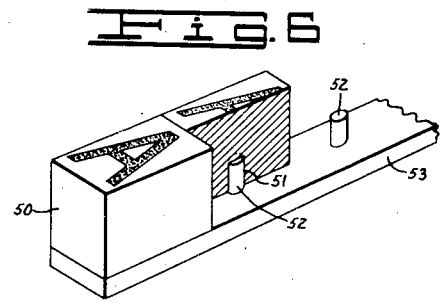
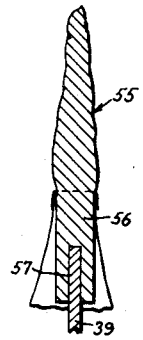
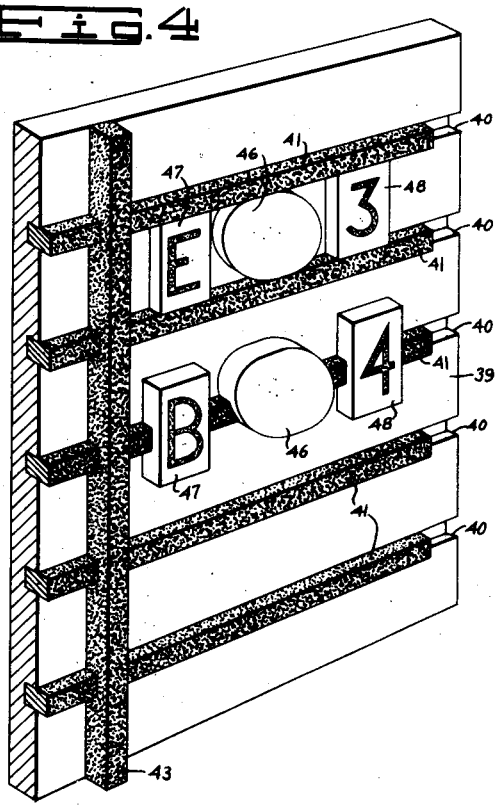
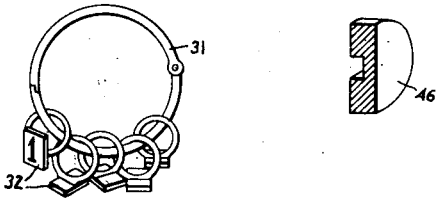
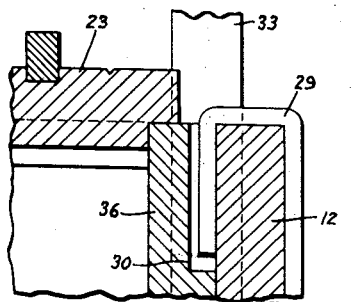
INVENTOR.
Marjorie Vincent Ross.
BY
ATTORNEY.

Patented Mar. 2, 1937

2,072,511

UNITED STATES PATENT OFFICE 2,072,511

PIANO TEACHING APPARATUS

Marjorie Vincent Ross, Long Beach, Calif.

Application March 30, 1936, Serial No. 71,629

11 Claims. (Cl. 84—470)

This invention relates to apparatus for teaching a young child to play the piano.

The general object of my invention is to provide novel keyboard and cabinet apparatus which may be used in teaching young children to play the piano.

A more specific object of the invention is to provide an apparatus including a novel combined dumb keyboard, staff, letters, notes, and blocks whereby a young child may learn to play the piano by sense of sight and touch.

A further object of my invention is to provide an apparatus including artificial hands having the fingers numbered to correspond with numbered rings on a child's fingers so that he may learn the proper fingering in learning to play the piano.

An additional object of my invention is to provide a novel piano teaching cabinet apparatus which may be collapsed to a compact form in order that it may be easily transported.

Other objects and the advantages of my invention will be apparent from the following description taken in connection with the accompanying drawings, wherein:

Fig. 1 is a perspective view showing my piano teaching apparatus in operative position;

Fig. 2 is a perspective view, with parts broken away, showing the apparatus in folded form;

Fig. 3 is a fragmentary, central, sectional view showing the upper portion of the housing;

Fig. 4 is a perspective view, partly in section, showing the construction of a staff;

Fig. 5 is a section through one of the note members;

Fig. 6 is a perspective view, partly in section, showing the letter members and their mountings;

Fig. 7 is a section taken on line 7—7 of Fig. 1 and showing the manner of attaching the hand;

Fig. 8 is a plan view of the key ring and finger rings; and

Fig. 9 is a section in detail showing the manner in which the brackets are supported.

Referring to the drawings by reference characters I have shown my invention as embodied in a piano teaching apparatus which is indicated generally at 10. As shown the apparatus includes a housing 11 preferably made of wood and which consists of ends 12, sides 13, a bottom 14, and a top or lid 15 which is hinged to the bottom 14. The housing is mounted on collapsible supports 16 which are hinged as at 17 to the ends 12. The bottom 14 is spaced from the edges of the ends 12 and sides 13 so that there is room between the sides and ends to receive the supports 16 when the latter are collapsed as shown in Fig. 2.

A catch 18 on a transverse member 19 serves to hold the supports in place (see Fig. 2), when closed and when open they are held by collapsible braces 20. On the front of the housing I provide a handle 21 by which the apparatus may be carried when in a folded position.

Secured to the housing 10 by means of catches 22 I provide a dumb keyboard 23, which may be made of wood and is provided with the usual black and white keys and which may include any desired number of octaves. Beneath the keyboard the housing includes a rectangular recess 24 which may be divided into compartments by a partition 25 to receive receptacles 26 which may contain the articles necessary for the operation of my apparatus, which articles will later be described in detail.

When it is desired to operate my device the catch 18 is released and the supports 16 swung into the position shown in Fig. 1. Latches 27 which hold the lid closed are then unfastened and the lid is raised. Pivoted braces 28 serve to hold the lid raised. The keyboard is then lifted and the various receptacles 26 thereunder may be conveniently placed on brackets 29 which removably fit grooves as shown at 30 in Fig. 5 and which are preferably disposed in pairs at the ends of the housing. The brackets are sufficiently long to receive a key ring 31 which receives a plurality of rings 32.

The keyboard is then returned to place and a pair of wooden posts 33 which are grooved as at 34 are fitted in inclined slots 35 which are arranged in the ends 12 and in blocks 36 secured to the inner face of the ends. The lid 15 may include pivoted arms 37 which fit in grooves 38 in the posts 33 to prevent the latter from shifting laterally.

Fitted in the grooves 34 I show a metal staff member 39 which comprises a body having grooves 40 therein in which bars 41 are fitted and preferably secured. The bars 41 are engaged by a clef 42 which is secured over the bars. The bars 41 provide lines and spaces while a measure bar 43 is grooved to have engagement with the bars 41.

When it is desired to merely add a few additional notes above or below the staff I provide a supplementary staff 44 which may be fitted in place by sliding it into the grooved posts as shown in Fig. 1. These supplemental staffs 44 contain horizontal grooves extending across the face thereof which are spaced to correspond to the distance between the lines on the full sized staff and into which grooves I may fit small rectangular bars 45 which are preferably made of a material which will give, such as presswood, rubber, etc. so that they will firmly but releasably engage in the grooves. These bars 45 and also the bars 41 protrude a sufficient distance to receive grooved note members 46 (see Fig. 5) and correspondingly grooved letter members 47 and number members 48. The notes 46, letters 47, and numbers 48 engage the bars to hold them in place. The note, letter, and number members are of such a width that when it is desired to place one of them in a space the latter grip the edge of the members and serve to hold them in place between the lines.

In conjunction with the notes, letter, and number members which are placed on the staff I employ lettered blocks 50 which are placed upon the keyboard keys as will be later described. These blocks 50 are provided with cylindrical holes 51 which may be fitted on short circular posts 52 mounted on a board 53 to hold the blocks in a secure position when not in use. The inside of the lid may be provided with a music rack 54.

Slidably positioned on the top of the staff 39 I show an artificial right hand 55 which includes a wrist portion 56 slotted as at 57 to fit on the upper edge of the staff and having five fingers 58 thereon which are numbered consecutively from right to left with digits 1 to 5. Although I show only the right hand it will be understood that another hand corresponding to a left hand may also be used. The fingers of this left hand are also numbered from right to left with digits from 1 to 5.

The rings 32 are numbered from 1 to 5 and in operation the pupil first places the rings 32 on his fingers in an order which corresponds with that of the numbers on the artificial hands. He then places the numbers 48 on the proper lines and spaces on the staff and in this way is able to observe which finger should be used when playing notes on the correspondingly numbered lines and spaces.

After the instructor or pupil has placed the letters 47 on the proper lines and spaces the pupil takes a correspondingly lettered block 50 and places it on the proper key on the keyboard, or, if desired, the instructor may first place the blocks on the keyboard and allow the student to place the corresponding letters and notes in their proper places on the staff.

I have shown my notes, etc. placed as for the key of C but other keys may be indicated by adding sharps and flats to the staff as will be readily understood.

Although I have described one procedure of using my device it will be understood that any method which may appear suitable may be employed and that changes may be made to suit the requirements in teaching each individual pupil.

In the use of my apparatus an appeal is preferably made to sight and color, thus the letter and number blocks are rectangular while the notes are somewhat elliptical. Carrying this idea further I preferably make the numbers blue for the lines in the treble and bass clefs and make the numbers red for the spaces in the treble and bass clefs. The letters and notes are preferably blue for the lines and added lines in the treble and bass clefs and are red for the spaces in the treble and bass clefs. The bar lines are preferably black.

I have found the foregoing color arrangement most effective but it will be understood that I do not wish to be limited to any color or any combination of colors in connection with my apparatus.

From the foregoing description it will be apparent that I have provided a novel piano teaching apparatus which is simple in construction and highly efficient in use.

Having thus described my invention I claim:

1. In a piano teaching apparatus, a housing, said housing including ends, sides, a bottom, and a top, means to support said housing, a pair of posts on said housing, said posts having opposed grooves, a staff member having its ends in said grooves, said staff member including a plurality of protuberant bars and grooved block members fitted on said bars, said block members being of a width to fit between said bars.

2. In a piano teaching apparatus, a housing, said housing including ends, sides, a bottom, and a top, means to support said housing, a pair of posts on said housing, said posts having opposed grooves, a staff member having its ends in said grooves, said staff member including a plurality of protuberant bars, grooved block members fitted on said bars, said block members being of a width to fit between said bars, a plurality of supplemental staffs secured above said first mentioned staff, said supplemental staffs being grooved and having protuberant bars in the grooves.

3. In a piano teaching apparatus, a housing, said housing including ends, sides, a bottom, and a top, said top being hinged to said bottom, means to support said housing, said ends being slotted, a pair of posts in said slots, said posts having opposed grooves, a staff member having its ends in said grooves, said staff member including a plurality of protuberant bars, grooved block members fitted on said bars, said block members being of a width to fit between said bars, a plurality of supplemental staffs secured above said first mentioned staff, said supplemental staffs being grooved and having protuberant bars in the grooves.

4. In a piano teaching apparatus, a housing, said housing including ends, sides, a bottom, and a top, said top being hinged to said bottom, means to support said housing, said housing having a compartment therein, receptacles in said compartment, a plurality of brackets on the ends of said housing, said brackets being adapted to support one of said receptacles, said ends being slotted, a pair of posts in said slots, said posts having opposed grooves, a staff member having its ends in said grooves, said staff member including a plurality of protuberant bars, grooved block members fitted on said bars, said block members being of a width to fit between said bars, a plurality of supplemental staffs secured above said first mentioned staff, said supplemental staffs being grooved and having protuberant bars in the grooves.

5. In a piano teaching apparatus, a housing, said housing including ends, sides, a bottom, and a top, said top being hinged to said bottom, a pair of supports on said housing, said supports being collapsible and being hinged to said ends, a transverse member in said housing, means on said transverse member to hold said supports closed, said housing having compartments therein, receptacles in said compartments, a plurality of brackets on the ends of said housing, said brackets being adapted to support one of said receptacles, said ends being slotted, a pair of posts in said slots, said posts having opposed grooves, a staff member having its ends in said grooves, said staff member including a plurality of protuberant bars, grooved block members fitted on said bars, said block members being of a width to fit between said bars, a plurality of supplemental staffs secured above and below said first mentioned staff, said supplemental staffs being grooved and having protuberant bars in the grooves.

6. In a piano teaching apparatus, a housing, said housing including ends, sides, a bottom, and a top, said top being hinged to said bottom, a pair of supports on said housing, said supports being collapsible and being hinged to said ends, said housing having a compartment in the front thereof, receptacles in said compartment, said housing having a second compartment positioned in the rear of said first compartment, a plurality of brackets on the ends of said housing, said brackets being adapted to support one of said receptacles, said ends being slotted, a pair of posts in said slots, said posts having opposed grooves, a staff member having its ends in said grooves, said staff member including a plurality of protuberant bars and grooved block members fitted on said bars.

7. In a piano teaching apparatus, a housing, said housing including ends, sides, a bottom, and a top, said top being hinged to said bottom, a pair of supports on said housing, said supports being collapsible and being hinged to said ends, said housing having a rectangular compartment therein, a plurality of brackets on the ends of said housing, said brackets being adapted to support one of said receptacles, said ends being slotted, a pair of posts in said slots, said posts having opposed grooves, a staff member having its ends in said grooves, said staff member including a plurality of protuberant bars and grooved block members fitted on said bars.

8. In a piano teaching apparatus, a housing, said housing including ends, sides, a bottom, and a top, said top being hinged to said bottom, a pair of supports on said housing, said supports being collapsible and being hinged to said ends, a transverse member in said housing, means on said transverse member to hold said supports closed, said housing having a rectangular compartment in the front thereof, receptacles in said compartment, said housing having a second rectangular compartment positioned in the rear of said first compartment, a plurality of brackets on the ends of said housing, said brackets being adapted to support one of said receptacles, a key ring on said brackets, said ends being slotted, a pair of posts in said slots, said posts having opposed grooves, a staff member having its ends in said grooves, said staff member including a plurality of protuberant bars and grooved block members fitted on said bars.

9. In a piano teaching apparatus, a housing, said housing including ends, sides, a bottom, and a top, said top being hinged to said bottom, a pair of supports on said housing, said supports being collapsible and being hinged to said ends, said bottom being spaced from the edge of said ends a distance equal to the thickness of said supports, a transverse member in said housing, means on said transverse member to hold said supports closed, a handle on said housing, said housing having a rectangular compartment in the front portion thereof, receptacles in said compartment, said housing having a second rectangular compartment positioned in the rear of said first compartment, a plurality of brackets on the ends of said housing, said brackets being adapted to support one of said receptacles, said ends being slotted, a pair of posts in said slots, said posts having opposed grooves, a staff member having its ends in said grooves, said staff member including a plurality of protuberant bars, grooved block members fitted on said bars, a plurality of supplemental staffs secured above said first mentioned staff, said supplemental staffs being grooved and having removable protuberant bars in the grooves.

10. In a piano teaching apparatus, a housing, said housing including ends, sides, a bottom, and a top, said top being hinged to said bottom, a pair of supports on said housing, said supports being collapsible and being hinged to said ends, said bottom being spaced from the edge of said ends a distance equal to the thickness of said supports, a transverse member in said housing, means on said transverse member to hold said supports closed, a handle on said housing, said ends being slotted, a pair of posts in said slots, said posts having opposed grooves, a staff member having its ends in said grooves, said staff member including a plurality of protuberant bars, grooved block members fitted on said bars and a plurality of supplemental staffs secured above and below said first mentioned staff, said supplemental staffs being grooved and having removable protuberant bars in the grooves.

11. In a piano teaching apparatus, a housing, said housing including ends, sides, a bottom, and a top, said top being hinged to said bottom, a pair of supports on said housing, said supports being collapsible and being hinged to said ends, said bottom being spaced from the edge of said ends a distance equal to the thickness of said supports, a transverse member in said housing, means on said transverse member to hold said supports closed, a handle on said housing, said housing having a rectangular compartment in the front portion thereof, receptacles in said compartment, said housing having a second rectangular compartment positioned in the rear of said first compartment, a plurality of brackets on the ends of said housing, said brackets being adapted to support one of said receptacles, said ends being slotted, a pair of posts in said slots, said posts having opposed grooves, a staff member having its ends in said grooves, said staff member including a plurality of protuberant bars, grooved block members fitted on said bars and a plurality of supplemental staffs secured above said first mentioned staff, said supplemental staffs being grooved and having removable protuberant bars in the grooves.

MARJORIE VINCENT ROSS.